Sept. 16, 1952     C. A. PARKER     2,610,886
GARDEN TOOL

Filed Aug. 31, 1949

Inventor
CARL A. PARKER

By Patrick D. Beavers

Attorney

Patented Sept. 16, 1952

2,610,886

UNITED STATES PATENT OFFICE 2,610,886

GARDEN TOOL

Carl A. Parker, Clyde, Ohio

Application August 31, 1949, Serial No. 113,397

1 Claim. (Cl. 294—50.9)

The present invention relates to garden tools and it consists in the combinations, constructions and arrangements of parts herein described and claimed.

Generally there is provided a garden tool having an elongated handle to the lower end of which is attached a blade having a V-shaped edge and adjacent the lower end of the handle there is pivotally mounted a grasping device which is operable through linkage and levers from a handle mounted adjacent the upper end of the elongated handle. The device is useful for a variety of miscellaneous jobs upon a farm or in a garden.

It is accordingly an object of the invention to provide a device of the character set forth which is simple in construction and operation, inexpensive to manufacture, and yet effective and efficient in use.

Another object of the invention is the provision of novel means, in a device of the character set forth, for cutting the roots of weeds and other plants.

A further object of the invention is the provision of means whereby objects such as ears of corn may be picked up by the operator while he remains in a standing position.

A further object of the invention is the provision of a novel grasping arm forming a part of the invention.

Other and further objects of the invention will become apparent from a reading of the following specification taken in conjunction with the drawing, in which.

Figure 1:
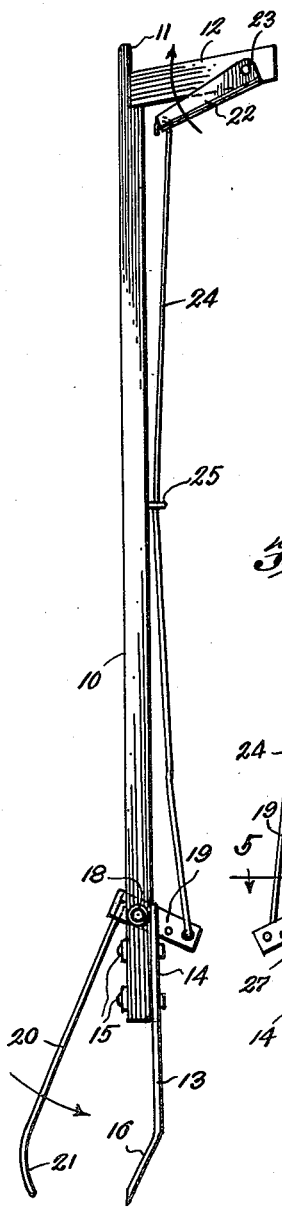
Figure 1 is a side elevational view of an embodiment of the invention.
Figure 2:
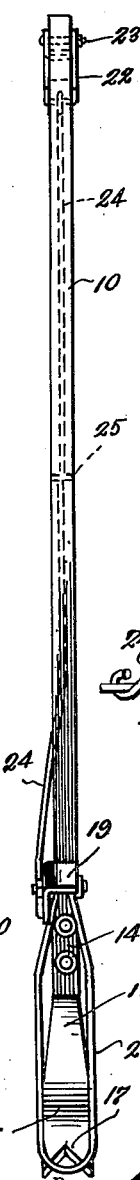
Figure 2 is an end elevational view thereof.
Figure 3:
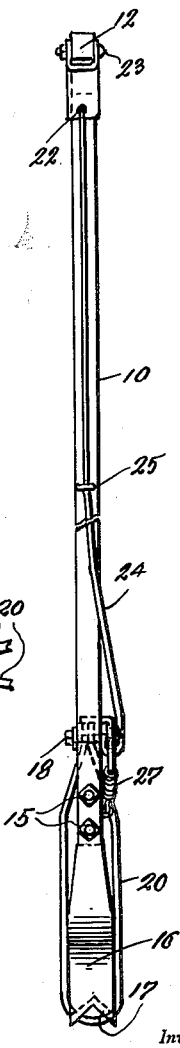
Figure 3 is a view similar to Figure 2 but taken from the opposite side thereof.
Figure 4:
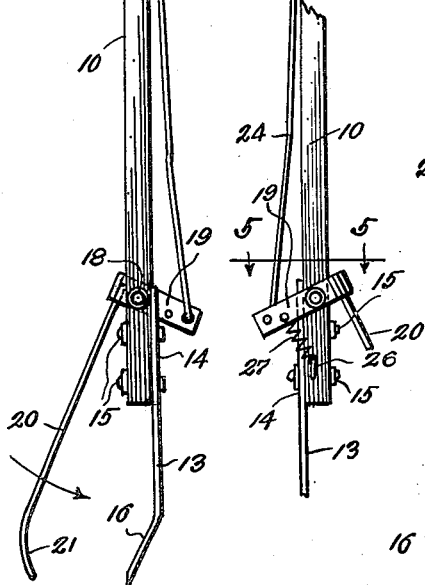
Figure 4 is a fragmentary elevational view taken from the opposite side of that shown in Figure 1.
Figure 5:
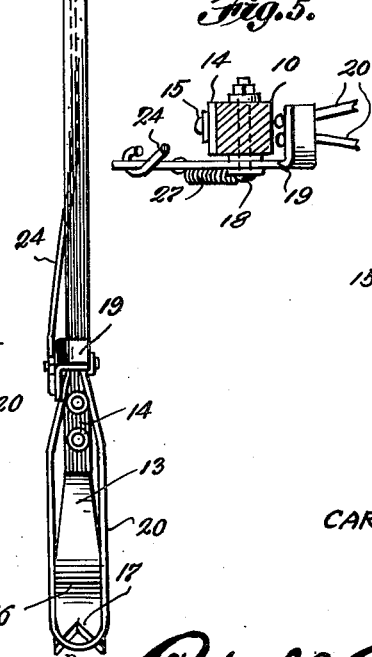
Figure 5 is an enlarged sectional view taken along line 5—5 of Figure 4.

Referring more particularly to the drawing, there is shown therein a garden tool having an elongated shaft 10 preferably formed of wood the upper end of which is notched, as indicated at 11, to receive an angularly disposed handle 12 also preferably formed of wood.

A digging and cutting element 13 is provided with a shank 14 which is affixed by means of bolts 15 to the lower end of the shaft 10 and which is provided with an integrally formed forwardly and angularly extending blade 16 having a V-shaped cutting edge 17 at its lower end.

Adjacent the lower end of the shaft 10 there is pivotally connected, as indicated at 18, a bell-crank lever 19 to the forward end of which is affixed a downwardly extending gripping member 20 formed of a single piece of looped wire the lower portion 21 of which is bent rearwardly.

A lever 22 is pivotally connected at one end, as indicated at 23, adjacent the outer end of the handle 12 and the free end of the lever is interconnected by means of an elongated link 24 with the rear end of the bell-crank lever 19. A guide member 25 for the link 24 is affixed to the rear side of the shaft 10 intermediate its ends and the rear portion of the bell-crank lever 19 is interconnected with an eye 26 mounted in the lower end of the shaft 10 by means of a torsion spring 27.

In operation, it will be apparent that when it is desired to, for example, remove corn in the form of ears from the ground, it is only necessary to retract the lever 22 by pulling the same toward the handle 12 through a mere gripping action of the hand of the user thereby moving the gripping member 20 toward the element 13 to thereby grasp the object desired therebetween without stooping. To deposit such article in, for example, a wagon it is only necessary to swing the device and at the same time release the lever 22 thereby allowing the spring 27 to draw the grasping member 20 away from the element 13 and thereby releasing the object which has been grasped thereby and it will be understood that the momentum thus imparted to the object will carry the same for a considerable distance to a point such as a wagon.

When it is desired to remove weeds, it is only necessary to press downwardly upon the upper end of the handle 12 thereby causing the blade 16 to enter the earth whereupon the edges 17 thereof will sever the roots of the adjacent plant or weed after which the lever 22 may be forced upwardly against the handle 12 to thereby grasp the weed or other plant whereupon the same may be removed to a desired point. It will also be understood that many other objects may be picked up without the necessity of stooping and various other uses will occur to the user in actual practice. It will also be understood that the link 24 is of flexible material.

While but one form of the invention has been shown and described herein, it will be readily apparent to those skilled in the art that many minor modifications may be made without departing from the spirit of the invention or the scope of the appended claim.

What is claimed is:

A device of the character described comprising an elongated shaft, a handle angularly extending from the upper end of the shaft, a forwardly and downwardly extending blade at the lower end of the shaft, a bell-crank lever pivotally mounted adjacent the lower end of the shaft and having a forward and a rearward arm, a downwardly directed grasping member affixed to the forward arm of the bell-crank lever, said grasping member being in the form of a loop formed of a single piece of wire, a hand-grip pivoted to the underside of the handle adjacent the outer end thereof, a link interconnecting the free end of the hand-grip and the rearward arm of the bell-crank lever and a spring interconnecting the rear arm of the bell-crank lever and said shaft.

CARL A. PARKER.

REFERENCES CITED

The following references are of record in the file of this patent:

UNITED STATES PATENTS

| Number | Name | Date |
| --- | --- | --- |
| 1,024,500 | Dahl | Apr. 30, 1912 |
| 1,082,547 | Nuttall | Dec. 30, 1913 |
| 1,751,481 | La Tourrette | Mar. 25, 1930 |
| 2,029,155 | Cervenka et al. | Jan. 28, 1936 |